United States Patent [19]
Ureshino

[11] 3,991,949
[45] Nov. 16, 1975

[54] APPARATUS FOR CONTINUOUS MANUFACTURING ANNULAR HELIX WIRE BEADS

[75] Inventor: Kashirou Ureshino, Kobe, Japan

[73] Assignee: Kobe Steel, Ltd., Kobe, Japan

[22] Filed: Apr. 10, 1975

[21] Appl. No.: 567,013

[30] Foreign Application Priority Data
July 11, 1974 Japan.............................. 49-82393
July 31, 1974 Japan.............................. 49-88705
Sept. 17, 1974 Japan............................. 49-107302
Nov. 18, 1974 Japan............................. 49-133017
Apr. 10, 1974 Japan.............................. 49-41244
Sept. 17, 1974 Japan............................. 49-107301
Sept. 25, 1974 Japan............................. 49-110754

[52] U.S. Cl. ............................................. 242/4 BE
[51] Int. Cl.² ........................................ B65H 81/02
[58] Field of Search ................. 242/4 BE, 4 R, 4 B, 242/7.09

[56] References Cited
UNITED STATES PATENTS
3,718,523  2/1973  Mallory .............................. 242/4 B
3,801,028  4/1974  LaBoda............................. 242/4 BE
3,864,188  2/1975  Grawey............................. 242/4 BE Primary Examiner—Edward J. McCarthy
Attorney, Agent, or Firm—Oblon, Fisher, Spivak, McClelland & Maier

[57] ABSTRACT

Apparatus for manufacturing annular helix wire beads for use in motor vehicle tires, wherein the manufacturing operation to wind winding wire upon an endless core wire is effectuated through three steps of preparation of, winding, and removal of, the articles, the operations being sequentially performed. The winding wire rotates around a part of the core wire and through the ring thereof in its peripheral direction, being helically wound up upon the surface of said core wire, while at the same time a new core wire may be readied for the winding operation while completed annular helix wire beads can be removed from the apparatus, whereby continuously high productivity is accomplished.

18 Claims, 15 Drawing Figures

APPARATUS FOR CONTINUOUS MANUFACTURING ANNULAR HELIX WIRE BEADS

BACKGROUND OF THE INVENTION

1. Field of the Invention

The present invention relates generally to apparatus for manufacturing wire beads and more particularly to apparatus for the continuous manufacture of annular helix wire beads which can be used in the manufacture of motor vehicle tire.

2. Description of the Prior Art

The use of a machine for helically winding wire upon a ring-shaped core wire has been proposed heretofore, such as for example, within U.S. Pat. No. 1,570,821. This patent discloses means for accomplishing the helical winding of wire upon a ring-shaped core wire by rotating the ring-shaped core wire in its peripheral direction while simultaneously rotating the winding wire drum relative to the core wire so that the drum will rotate around a portion of the core wire and will also pass through the ring of the core wire. The helix bead manufacturing process, itself based upon the method of the above invention, has proven, however, not only inefficient and such as to exhibit a low degree of production, but has also been unsuitable for practicing such a continuous manufacturing process as to serially or sequentially feed wire stocks, one after another, and to also successively remove completed wire beads.

Recently, a wire bead manufacturing machine has reportedly been developed which would be so constructed as to spirally wind wire, drawn out successively from a wire drum, upon the surface of a ring-shaped core wire by enabling the wire drum to rotate so as to pass around a portion of the core wire, and through the ring thereof, by the use of a wire-winding device which operates simultaneously with the core wire so the latter is rotated in the peripheral direction.

It seems that automatization of this machine has thereafter obtained some appreciable results, however, an adequate solution to the problem of having means for supplying the ring-shaped core wire and removing the completed article subsequent to the winding process has never been reported. As a result, the shutdown time in the operation and the low workability of the apparatus still fail to elevate the productivity as might have been expected.

Heretofore, a core wire guide roller for keeping a ring-shaped core wire freely rotatable has been pivoted upon a shelf-like support frame fixedly secured within a preselected portion of a manufacturing machine body, and a wire drum has also been disposed at a predetermined location within a winding device of the same machine. Various auxiliary operations, except the wire-winding operation proper to the wire bead manufacturing machine, namely, the preparatory operation prior to winding such as for example, the setting of the core wire onto its guide roller, take-up or supplying of the winding wire to the wire drum, and winding up of the winding wire end to the core wire clamp, and the like, as well as removal of the completed articles from the guide roller after the conclusion of the winding operation, have been conducted as parts of the wire-winding operation and upon the same machine.

Such kinds of operations conducted upon one and the same machine, however, have come to be obviously subjected to various restrictions and difficulties with regard to spatial relationships, resulting in the decline of productivity, machine shut-downs during preparatory operations prior to winding and removal operations after completion of the articles, and further gross hinderances upon the automatization of the machinery itself.

SUMMARY OF THE INVENTION

Accordingly, one object of the present invention is the provision of an apparatus that will perform efficiently the preparatory operations prior to winding and the removal operations after completion of the articles within a broad area or space exteriorly of the manufacturing machine.

Another object of the present invention is the provision of an apparatus that will perform quickly and easily the removal of the articles after the conclusion of the winding operation as well as the supply operation of both the core wire and the winding wire for a subsequent operation, all within the same machine so as to resume, without delay, the winding operation.

A further object of the present invention is the provision of an apparatus that will raise the productivity of the machine and improve its operative capacity and efficiency.

A still further object of the present invention is the provision of an apparatus within which a rotary body so constructed as to pass around a part of the ring-shaped core wire and through the ring thereof would have sufficient strength so as to withstand long use and provide an extended service life.

An even further object of the present invention is the provision of an apparatus that will be able to wind the winding wire up to and upon the core wire in perfect alignment.

The foregoing and other objects have been excellently achieved by the apparatus of the present invention which is characterized by a core wire drive mechanism which is adapted to rotate the core wire in its peripheral direction, a rotary body having a radial slit section adapted to rotate as the same passes through the ring of the core wire, around a part of the latter as a center, a drive mechanism for the rotary body, and a drum support mechanism rotatably disposed within a setting aperture bored within the rotary body with the freedom of passing therethrough for loading and unloading. A wire drum is rotatably disposed within the drum support mechanism and a carrying table rotatably sustaining the core wire in its peripheral direction and shifting the same for passing the wire through the above slit section is also provided as well as a mechanism for loading and unloading the drum support mechanism.

The provision of the above-mentioned carrying table enables one to put into practice the preparatory step so as to have the core wire sustained upon the carrying table simultaneously with, and utilized even when the wire-winding operation upon the core wire is being performed. In addition, as the carrying table is also designed to pass through the slit section of the rotary body, the completed articles, that is, the wire beads, after the conclusion of the wire winding operation, are able to move away to the opposite side, while a new core wire prepared in advance enters at the same time within the slit section, whereupon the wire-winding operation is resumed without delay.

Consequently, it becomes possible to perform both the product-removing and the subsequent core wire loading operations within and during the course of the wire-winding operation, with the result that the shutdown time in the cyclic operation is remarkably reduced, the workability is substantially increased, and the productivity is vastly improved and elevated to a considerably high degree.

In operation of the apparatus of the present invention, the endless ring-shaped core wire rotates in a circular movement around its center point or axis and within its plane, and since, within the rotary body a radial slit is provided, a part of the core wire passes therethrough while the other part thereof goes through the central position of the rotary body. In addition, as the plane formed by the rotary body comes to intersect the plane of the core wire at right angles thereto, the rotation of the rotary body is independent of the circular movement of the core wire and the peripheral portion of the rotary body rotates while passing through the core wire ring.

Moreover, within the setting aperture bored within the rotary body there will be rotably disposed the drum support mechanism which can pass through the hole or aperture with a freedom for loading and unloading, and upon which the wire drum, within the coiled winding wire, will be rotatably mounted. The winding wire is drawn out from the wire drum and is secured upon the core wire and when the core wire and the rotary body are synchronously rotated, the wire drum traverses a circular movement which passes through the ring of the core wire in accordance with the rotary movement or revolution of the rotary body. The winding wire, the end of which is secured upon the core wire, is successively drawn out as the core wire rotates within its circular movement, and comes to be helically wound upon the surface of the core wire.

Since the drum support mechanism will auto-rotate freely within the rotary body, the winding wire drawn out from the wire drum suffers torsion corresponding to the rotation of the drum support mechanism, however this torsional stress might be almost negated from being generated by rotating the drum support mechanism at a predetermined number of revolutions. As clearly understood from the previous description concerning the carrying table, it is possible to very easily practice both the supply of the ring-shaped core wire for the wire winding step of this machine and removal of the completed article after completion of the wire-winding operation.

Furthermore, as an effectual manufacturing arrangement, there is provided a rotation stop positioning mechanism so as to bring the position of the slit section of the rotary body to the level of the carrying table at the time when rotary movement of the rotary body ceases, such structure thereby facilitating the operation when the carrying table begins to shift between operative stations. As another effectual manufacturing arrangement, there is also provided, in consideration of compacting the linkage or relationship between the rotary body and the machine body, which is traceable to or based upon the presence of the slit section and the drum support mechanism setting aperture, an apparatus of such structure which provides that the slit section and the center of the setting hole may come as close as possible to each other at a location somewhere upon the rotary body.

As a further effectual arrangement, there is additionally provided a system wherein a turn-table will be chosen as the carrying table in order to render the operation of the apparatus more efficient, and as still a further effectual arrangement, there is provided a guide section wherein a preliminary fixture of winding wire upon the core wire will be securely effectuated and wherein further, such fixture section will not obstruct the rotational motion of the core wire.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
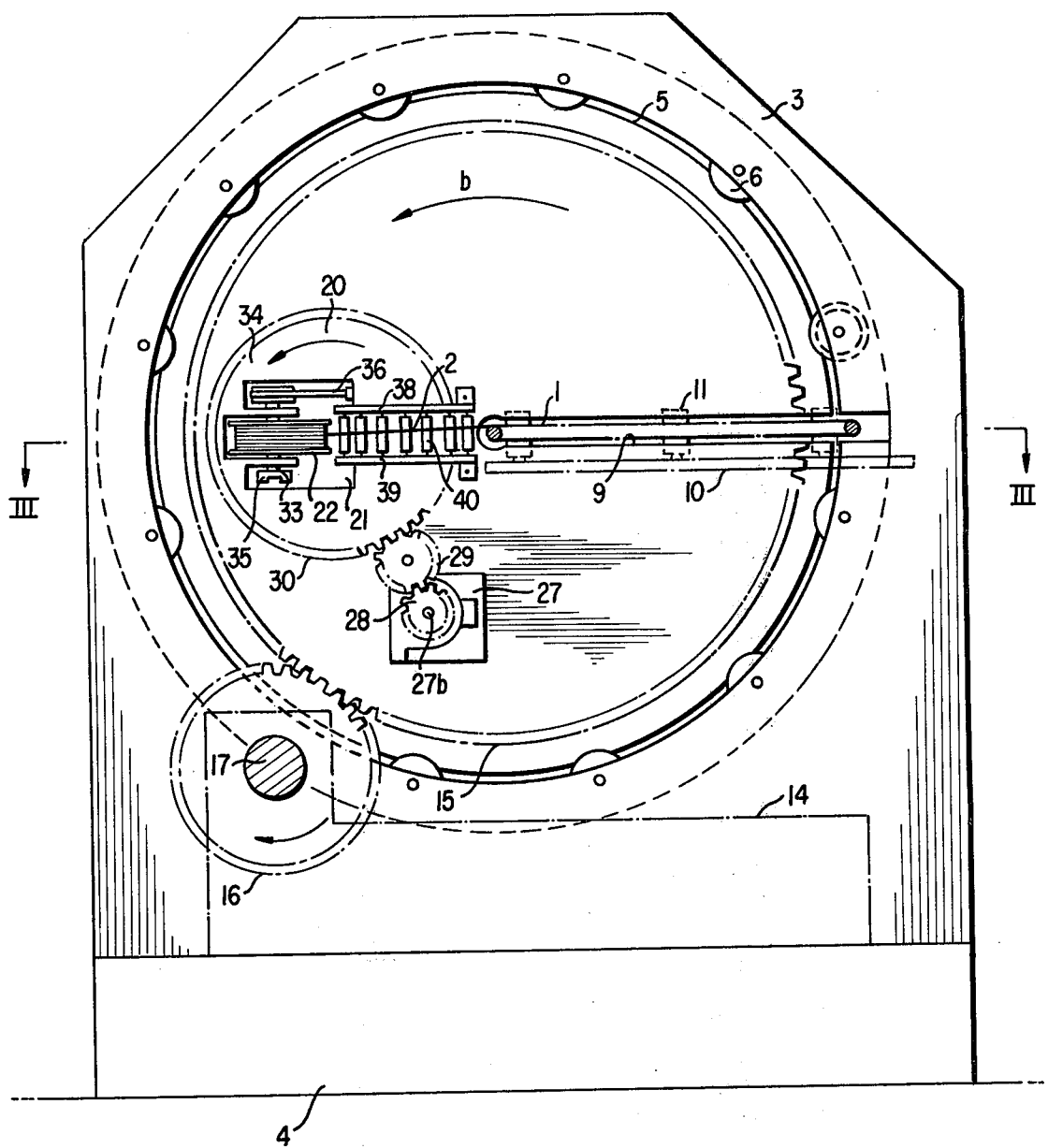
FIG. 1 is a front elevational view showing one example of the basic configuration of a helical bead manufacturing machine.
Figure 2:
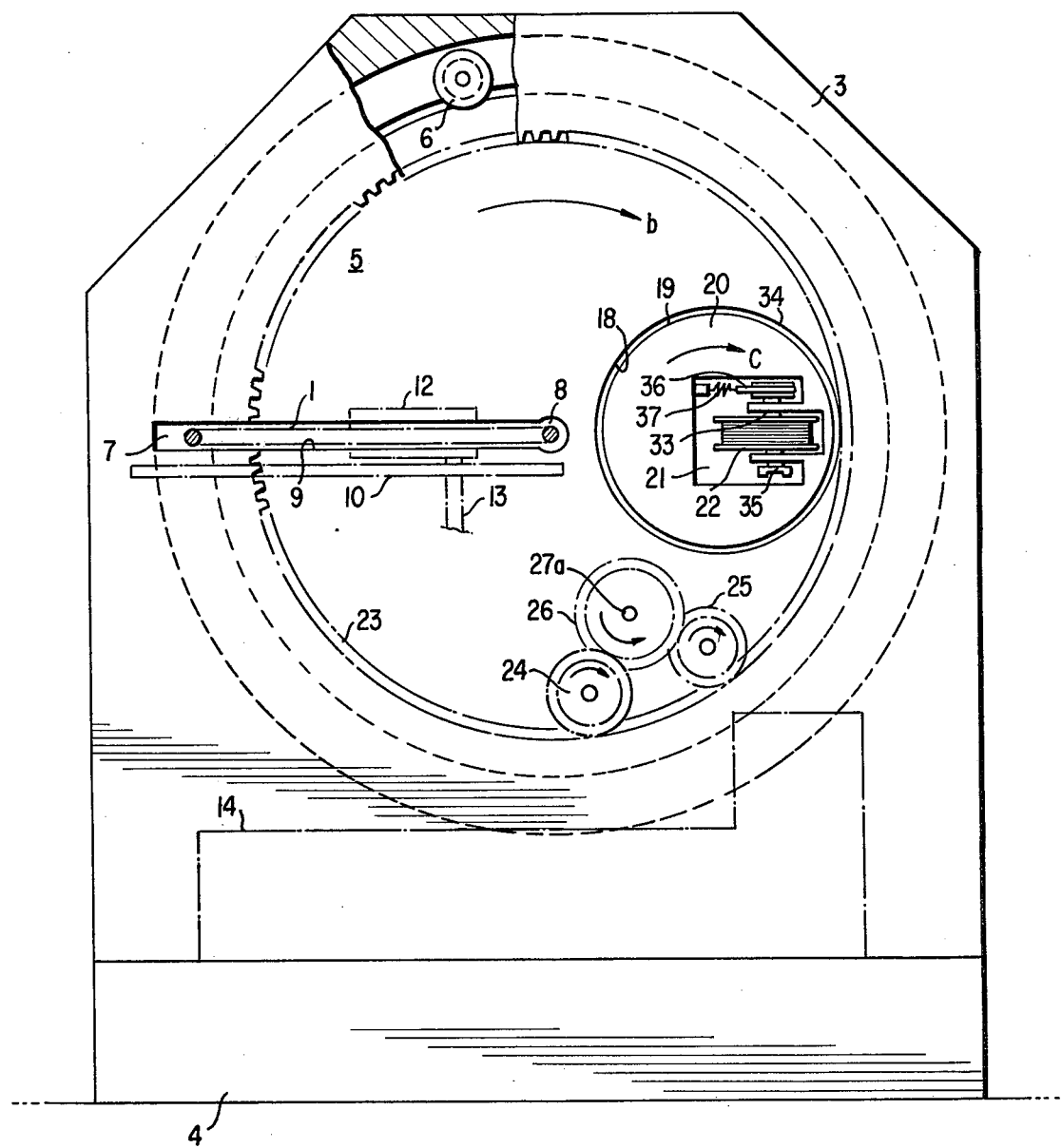
FIG. 2 is a rear elevational view of the machine of FIG. 1.
Figure 3:
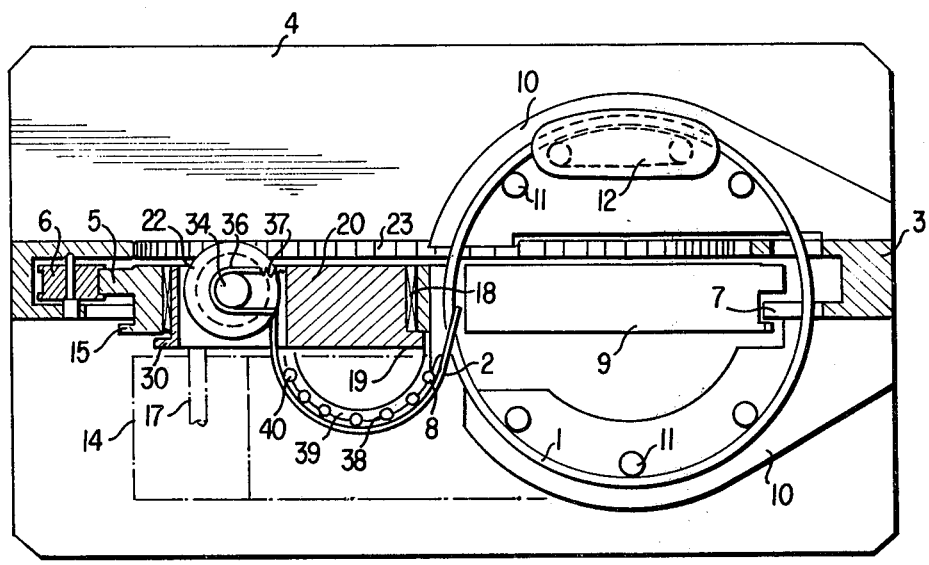
FIG. 3 is a cross-sectional view of the machine of FIG. 1 taken generally upon the line III—III of FIG. 1.

Referring now to the drawings, and more particularly to FIGS. 1–3 thereof, the basic configuration of the wire bead manufacturing apparatus is illustrated wherein a disc or flyer 5 is rotatably supported upon the central section of the wire bead manufacturing apparatus body 3 through means of a plurality of bearing rollers 6, and the flyer 5, that is, the rotary body, is provided with a radial slit section 9 which enables a carrying table, to be described more particularly hereinafter, to pass therethrough so as to carry an annular core wire 1 thereinto and to remove a completed article therefrom. The flyer 5 and the core wire 1 are preset so as to be able to freely mutually rotate at a predetermined rotary ratio when the core wire 1 has been carried thereinto.

More particularly, the core wire 1 is supported, as best seen in FIG. 3, upon a support frame 10 through means of a plurality of guide rollers 11 so as to revolve with the aid of a core wire feeding device 12, such as for example, in accordance with clamp feed or pinch roller techniques, in which case, the drive shaft 13 of the core wire feeding device 12 projects outwardly from a drive gear box 14 so as to be interlocked and coupled therewith. It is noted that the core wire feeding device 12 is so constructed as to be able to be temporarily removed toward the side by means of a suitable device, not shown in the figure, so as not to interfere with the core wire 1 when the same is carried thereinto.

Within the external periphery of the flyer 5 there is provided a gear 15 which engages a flyer drive gear 16 which is fixedly secured upon a flyer drive shaft 17, and the rotational ratio of the flyer 5 relative to the core wire 1 is determined in a manner corresponding to the helical pitch of a winding wire 2. Within a circular aperture 18 provided within the flyer 5, there is furnished suitable bearing structure 19 and within which there is disposed a rotatable planet board 20. A substantially square aperture 21 is provided within the board 20 and a wire drum 22 is rotatably supported upon a satellite shaft 33 all of the same being so constructed as to revolve around and through the ring of the core wire 1 in accordance with the rotation of the flyer 5.

Referring now to the reverse side of flyer 5, and particularly to FIG. 2, upon the manufacturing machine body 3 there is provided a fixed internal sun gear 23 which engages a pair of planet gears 24 and 25 and an intermediate gear 26. The gears 24, 25, and 26 are rotatably supported upon the reverse side of the flyer 5 so as to revolve in an auto-rotating manner and in accordance with the rotation thereof, while upon the obverse side, as seen in FIG. 1, a gear 30 of the planet board 20 engages an intermediate gear 29 which is rotatably supported upon the surface of the flyer 5, and which in turn engages a gear 28.

Interposed between gears 28 and 26 is a stepless change gear 27 and it is also seen that gear 26 is secured to an input shaft 27a of the stepless change gear 27 while gear 28 is secured to an output shaft 27b thereof, so that the rotational ratio of the gears 26 and 28, namely, the number of revolutions of the flyer 5 for wire winding and that of the planet board 20 for torsion truing, is infinitely adjustable. In addition, a speed regulating motor 32 annexed thereto would be able to remotely control the adjustment of the revolution ratio and such may even be accomplished during operation of the flyer 5 without breakage of the wire during the wire-winding operation.

Upon one end of the satellite shaft 33 associated with the wire drum 22 there is provided a brake drum 34 and upon the other end thereof there is disposed a wire-winding flange 35, a brake band 36 being elastically secured upon brake drum 34 through means of a tension spring 37 whereby the same is always ready for braking at any moment. Furthermore, a semi-circular wire guide 38, which comprises, for example, a plurality of adequately spaced wire guide rollers 40 rotatably supported by means of an arcuate supporting frame 39, will accurately guide the winding wire 2 to the winding position upon the core wire 1.

Within this basic apparatus, some automatization has indeed been realized through the use, for example, of the flyer 5 and the like, at least as far as the wire winding mechanism within the manufacturing apparatus is concerned, however, each and every operation such as, for example, supplying the winding wire 2 onto the wire drum 22, supplying the core wire 1 and disposing the same upon the guide rollers 11, clamping the winding wire end, and removing the completed article from the guide rollers 11, and the like, has been effectuated at the wire winding position or station upon the manufacturing machine, thus entailing various restrictions and difficulties in connection with the spatial relations thereof, and consequently, workability of the same has remained poor.

Figure 4:
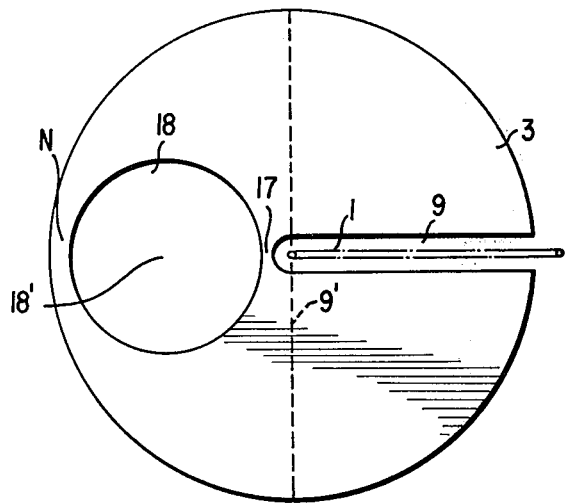
FIG. 4 is a schematic drawing of a flyer in conventional manufacturing machines.

Within the apparatus illustrated within FIGS. 1–3, the relation of the slit section 9 to the circular aperture 18 is as disclosed within FIG. 4, and it is seen that the flyer 5, which is supported upon or connected with the machine body 3 only at the locations designated M and N had a large weak point whereby both strength thereof and accuracy of the winding operation were very low due to the narrow breadth of the M and N portions. As a result of the above noted phenomena, high speed rotation of the flyer 5 might stagnate the same and the productivity of the manufacturing machine remains poor. There was also the drawback that the automatization system might become very intricate and over-sized because of the inevitability of setting the core wire stock and the wire drum within the diametrical direction when trying to perform the supply and removal of the core wire stock or article, relative to the wire drum mechanically and automatically.

Figure 5:
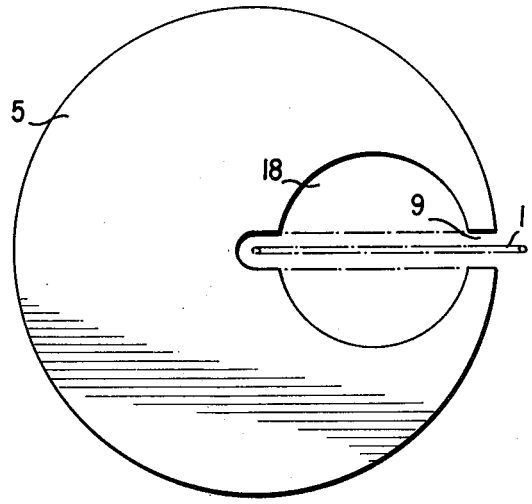
FIG. 5 is a drawing similar to that of FIG. 4 showing however a flyer which exhibits improved strength.

Still further, it was also noted that if the central portion of the aperture 18 is disposed closer to the slit opening 9 than the center line 9' orthogonal to the center line of the slit section 9, the stength of the flyer 5 might be improved, and the supply or removal operations of the stock and article might also be automated. It was still further found that it would be more preferable, as best seen in FIG. 5, to in fact interconnect the aperture 18 with the slit section 9 and to dispose the central portion of the former upon the central line of the latter.

It is to be noted that while any of the hereinafter described effectual examples is consistent with the model illustrated within FIG. 5, the apparatus pursuant to the present invention shall however, not be restricted to only such type of an arrangement.

One of the important aspects of the present invention is that there is provided a carrying table which can pass through the slit section 9 within the flyer 5 and also shift in a direction orthogonal thereto, the form, construction fittings and the like comprising no particular definition. Nevertheless, a few examples usable within this invention may be given, such as for example, a table reciprocating through the slit section 9 over the face orthgonal to that of the flyer, or a turn-table swiveling on the face, and the like, among which the preferred mode is the latter design. An example therefore, in accordance with this design will now be illustrated and described.

FIGS. 6 to 13 are an example employing a turntable.

Figure 6:
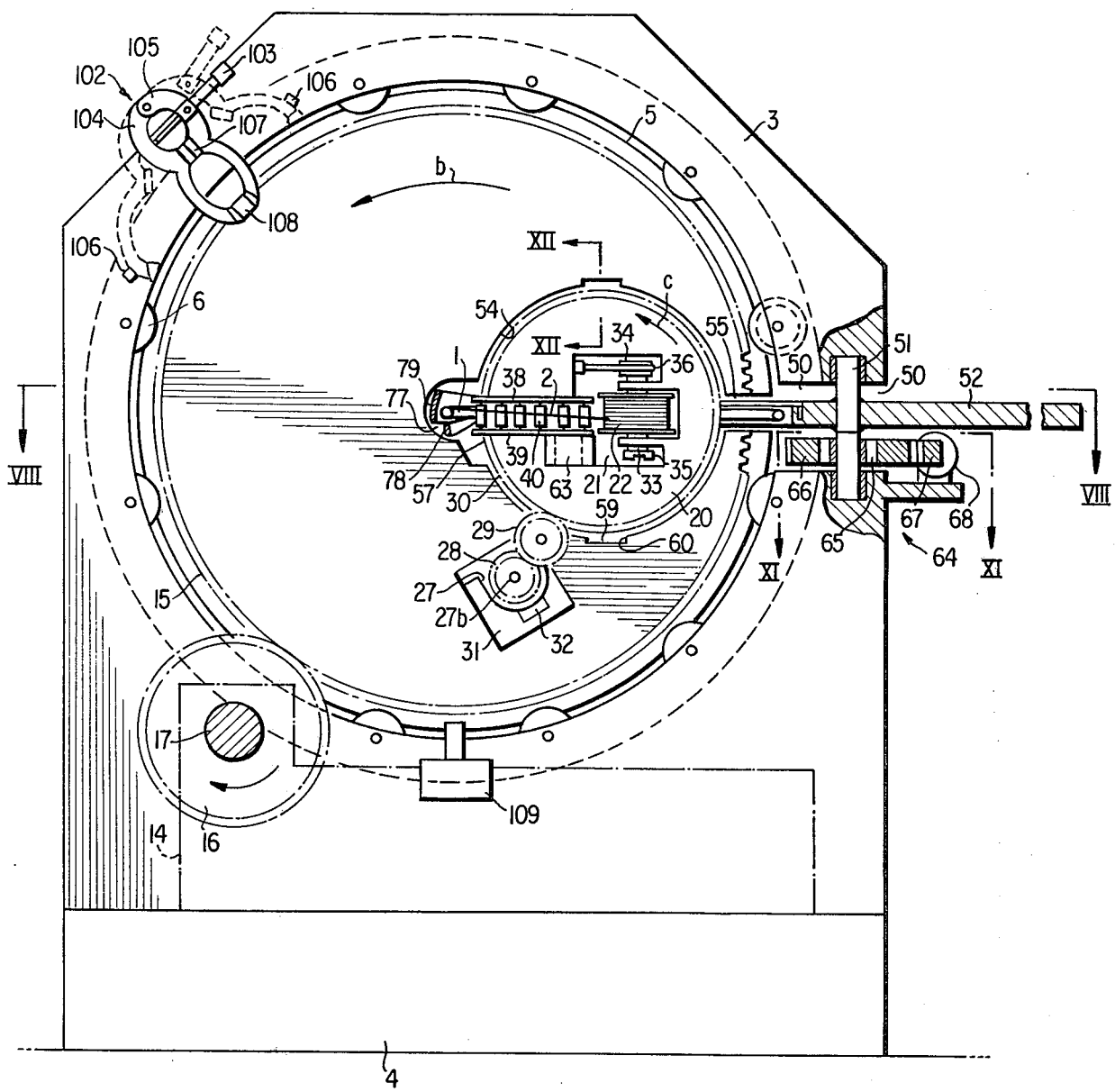
FIG. 6 is a front elevational view of apparatus employing a turn-table mechanism.
Figure 7:
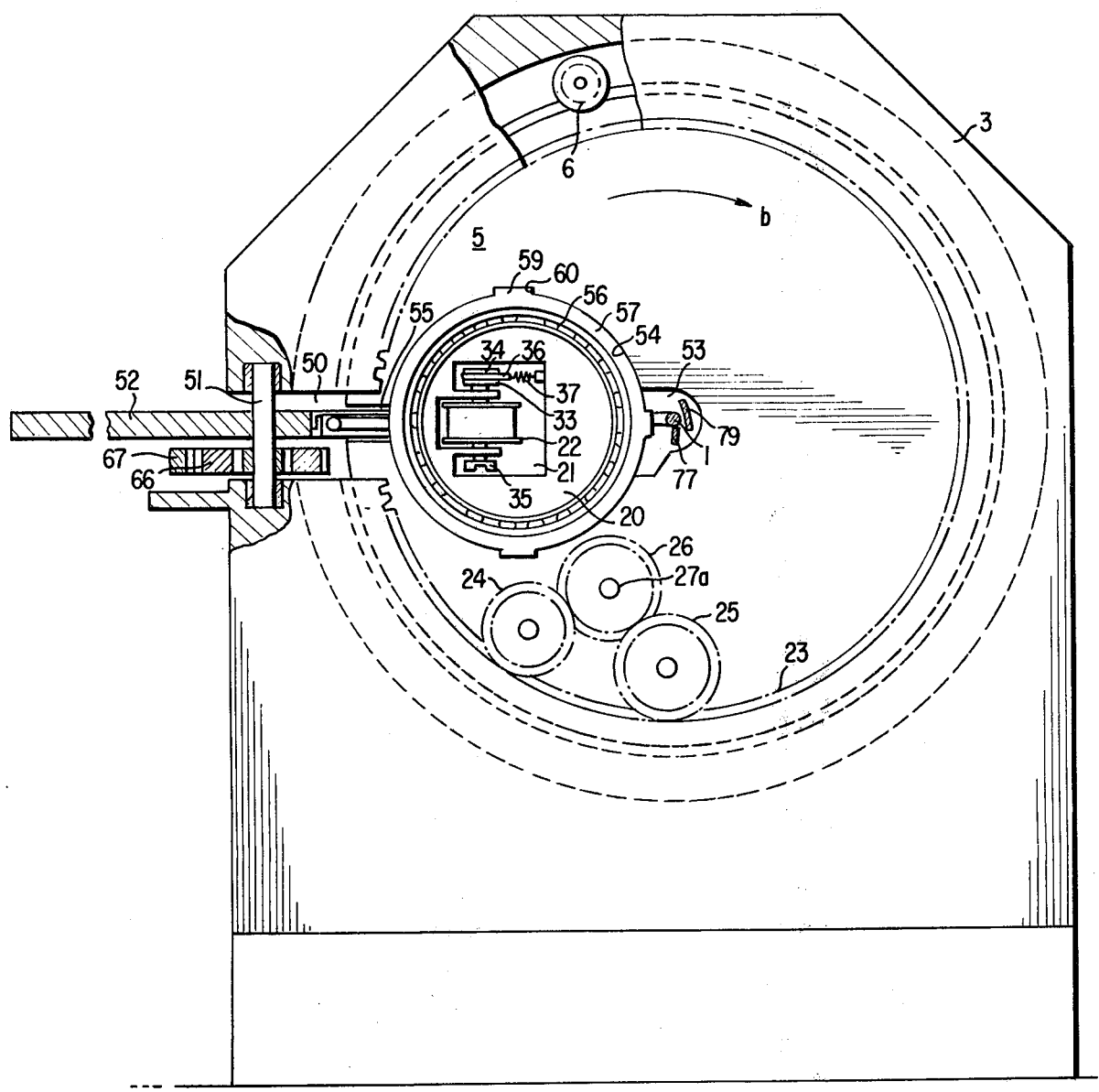
FIG. 7 is a rear elevational view of the apparatus of FIG. 6.
Figure 8:
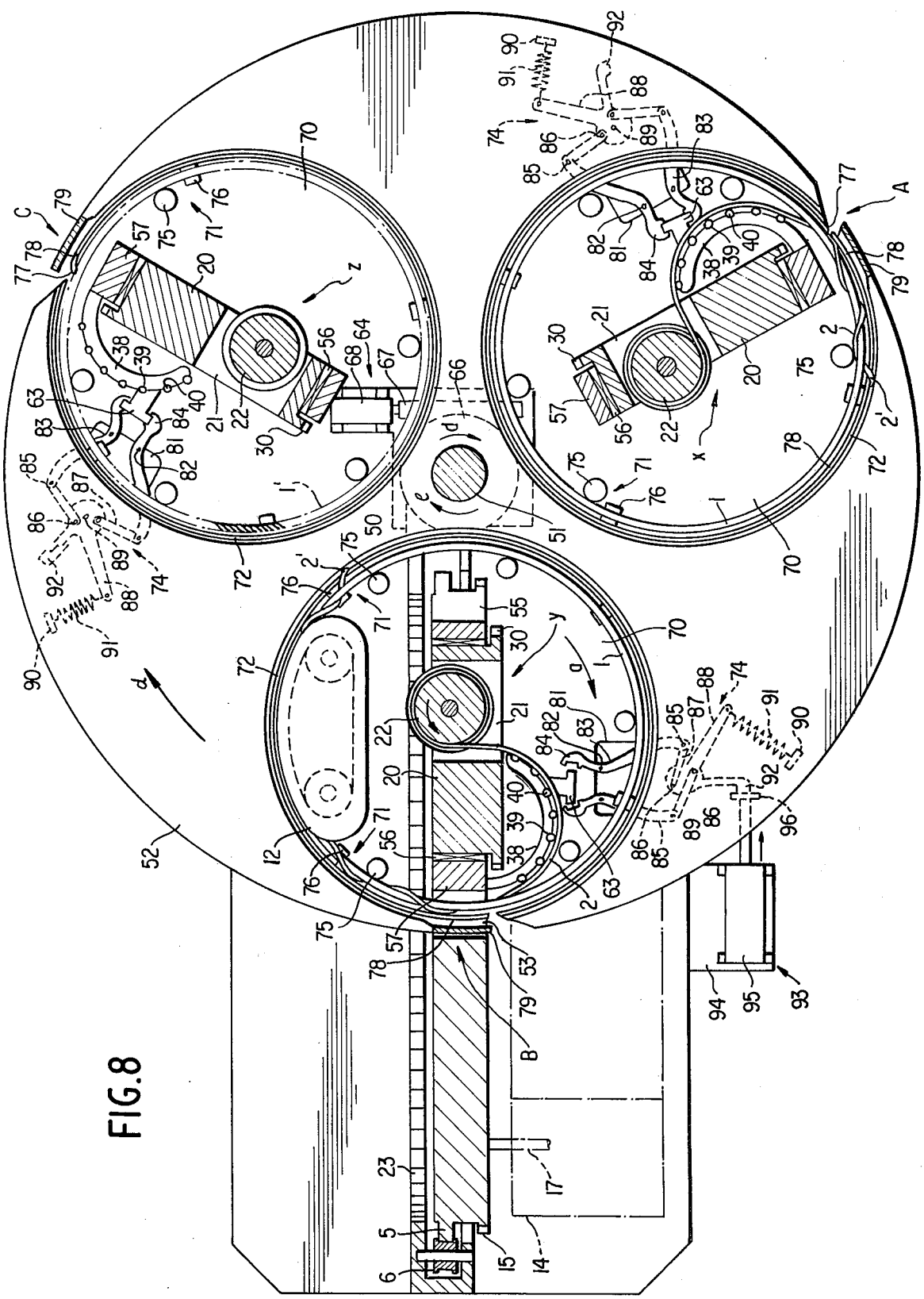
FIG. 8 is an enlarged sectional view of the apparatus of FIG. 6 taken generally upon line VIII—VIII of FIG. 6.

Referring then to FIGS. 6–13, within a notched groove or portion 50 of the manufacturing machine body 3 there is pivotably supported, through means of a shaft 51, a turntable 52 which is so constructed as to be able to carry three sets of wire supply units, generally designated by the reference characters X, Y, and Z as best seen in FIG. 8, into and out of three successive stations disposed within the rotational route of the table 52, namely, a stock supplying station A, a winding station B, and an article removing station C, respectively.

The wire bead manufacturing machine is thus to be installed so as to be disposed as at the winding station B, and then the flyer 5, the main body of the wire winding device of the machine, is provided with the drum supporting mechanism aperture 54 which of course corresponds to the aperture 18, although the relative disposition of the same is basically as shown in FIG. 5. Each wire supplying unit X, Y, Z comprises a wire drum 22, a planet board 20, a wire withdrawal guide 38, and their accessory members. Within this embodiment, the planet board 20 is rotatably supported through means of an annular bearing 56 provided upon a support body 57, as seen in FIG. 7, and the wire withdrawal guide 38 is also disposed upon the support body 57, the wire supplying units X, Y and Z therefore being able to be replaceably carried into and out of the setting aperture 54.

Figure 9:
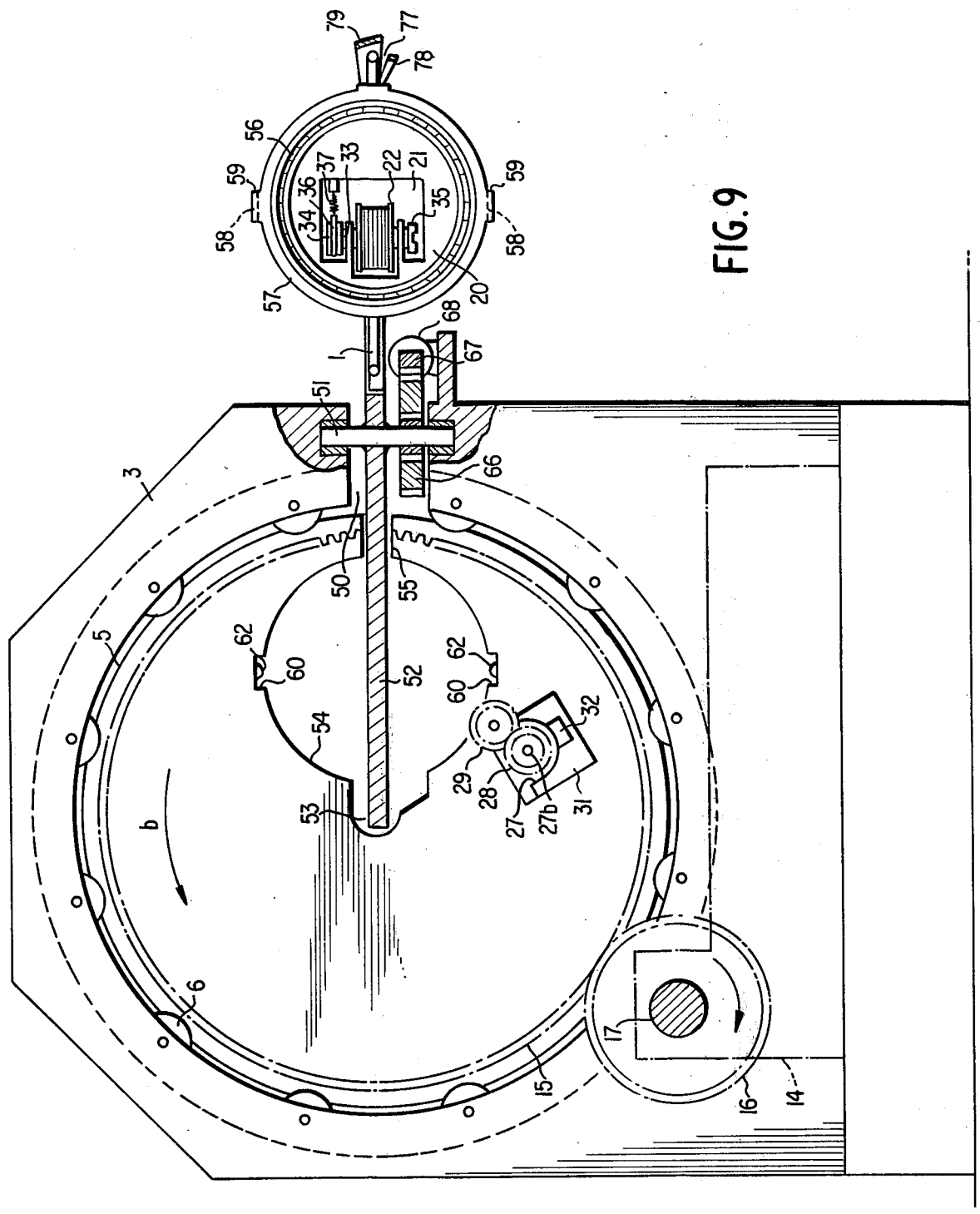
FIG. 9 is a view similar to that of FIG. 6 showing however the state of the turn-table during one rotational phase thereof.
Figure 12:
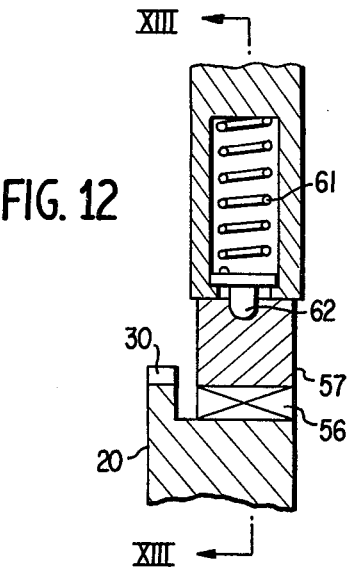
FIG. 12 is an enlarged cross-sectional view taken generally on line XII—XII in FIG. 6.
Figure 13:
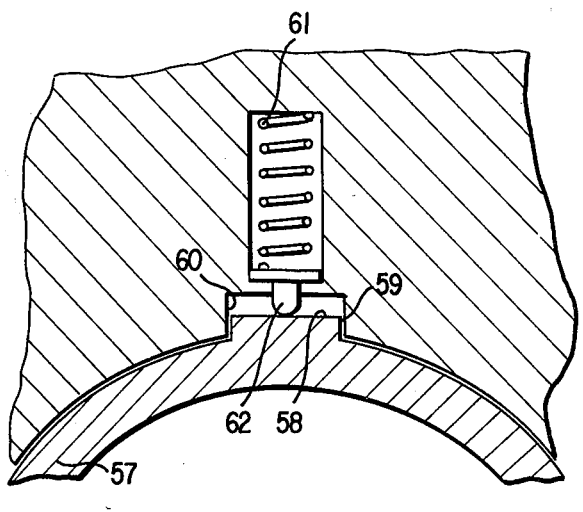
FIG. 13 is a cross-sectional view taken generally upon line XIII—XIII of FIG. 12.

As shown within FIGS. 9, 12 and 13, upon the periphery of the support body 57 there is also provided a radial protrusion 59 which includes recess 58, and similarly, within setting aperture 54, there is also provided a recess 60 for receiving the protrusion 59, a detent 62 being elastically supported within the recess 60 through means of a spring 61 as seen in FIGS. 12 and 13. In addition, as seen within FIG. 8, a projection 63 is adapted to be clamped when the wire supplying units X, Y, and Z are disposed within the setting aperture 54, and while, within this illustration the projection 63 is provided upon the wire withdrawal guide 38, it may also be disposed upon the support body 57 or upon the planet board 20.

Figure 11:
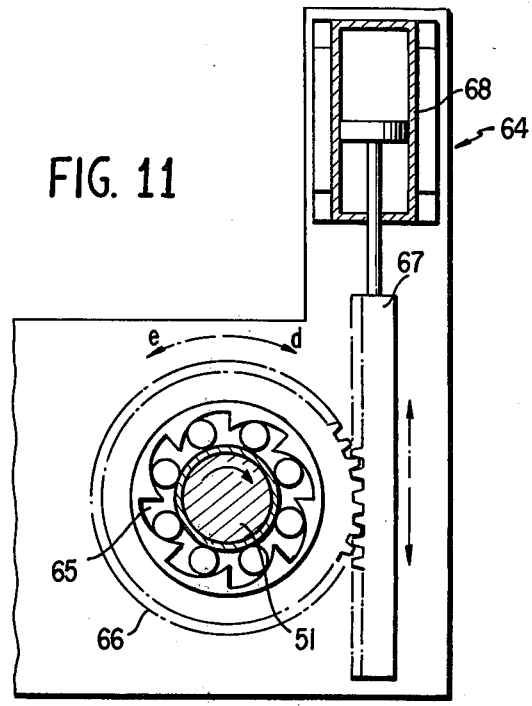
FIG. 11 is an enlarged cross-sectional view taken generally upon line XI—XI of FIG. 6.

Within the axle section of the turntable 52, there is provided table swivel equipment, generally indicated by the reference character 64, and upon the shaft 51 there is disposed a gear 66 and a one-way clutch 65, the gear 66 engaging a rack 67, see FIGS. 6, 8, and 11, which is secured to the rod end of an air cylinder 68 which is rigidly fixed upon the manufacturing machine body 3. The rack 67 is so disposed as to be capable of driving the turntable 52 in the direction of the arrow d through means of the one-way clutch 65 and the gear 66 only when in fact rotating gear 66 in the direction of the arrow d upon the forward stroke thereof, the turntable 52 not in fact turning although gear 66 rotates in the direction of the arrow e upon the backward stroke of the cylinder 68, as a result of the skidding of the one-way clutch 65.

A through bore 70 is provided in order to permit the flyer 5 to rotate without interference with table 52 at the winding station B and also to permit the wire feeding device 12 to be inserted. Moreover, upon the peripheral portion of each through bore 70 there is provided a plurality of core wire retaining devices, generally indicated by the reference character 71, a winding wire end guide groove 72, and a clamping means, generally indicated by the reference character 74, of the wire supply unit.

Figure 10:
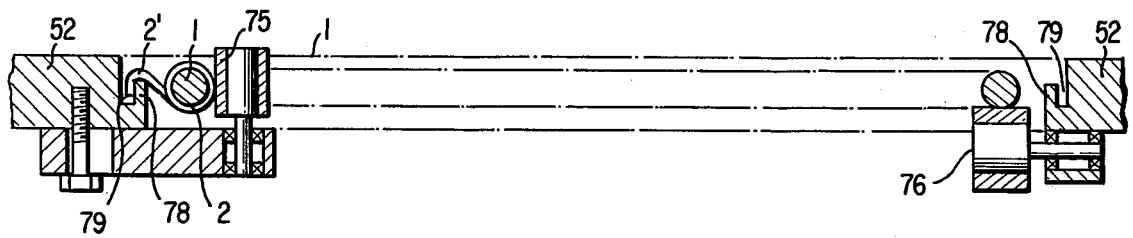
FIG. 10 is an enlarged longitudinal cross-sectional view of the principal part of core wire retaining mechanism.

The core wire retaining device 71, which rotatably retains the ring-shaped core wire 1 in its peripheral direction, usually comprises a plurality of interior guide rollers 75 as well as lower guide rollers 76 disposed beneath wire 1, as shown in FIG. 10, and, if necessary, upper guide rollers not illustrated.

The winding wire end guide groove 72, which is provided for the purpose of clamping the winding wire end and the ring-shaped core wire, is disposed radially outwardly of the outside periphery of the ring-shaped core wire 1 and is partially cut away at a predetermined part, where a wire transfer section 77 for the winding is formed. Upon this occasion, care is given so as to smoothly perform the delivery operation of the winding wire and between the first and the last guide ends of the inside wall 78 of the guide groove 72 on both the front and rear sides of the wire transfer section 77. A subsidiary wall 79 is provided for preventing the wire end from any extraordinary outwardly projection at the time when the wire end is delivered.

The clmping means 74 of the wire supply unit comprises a linkage, as shown in FIG. 8, whereupon bearing stands 81, secured at three positions to the reverse side of the turntable 52, there are oscillatably pivoted, through means of a pair of gears 82, clamp levers 83, each tip of which is equipped with a clamp claw 84 and the other ends of which are coupled, that is, interlocked, through means of pins 85 and 86 and intermediate levers 87, a clamp control lever 88, which is oscillatably pivoted through means of a pivot 89, upon the reverse side of the table 52. Adjacent the tip of lever 88 there is disposed a bracket 90 also secured to the reverse side of the table 52, and a tension spring 91 is interposed between lever 88 and bracket 90, the spring imparting to the lever 88, and more particularly, clamp lever 83, a biasing force in the clamping direction.

This control lever 88 is integrally formed with a clamp lever 92, and near the winding station B there is provided a clamp opening means, generally indicated by the reference character 93, which comprises a trap 96, which is detachable or attachable to the clamp release lever 92, disposed upon the rod tip of an air cylinder 95 which in turn is secured upon a trestle 94 disposed upon the machine body 3, the interconnection between lever 92 and trap 96 being made at the time when the winding station B shifts or swivels.

In addition, as seen in FIG. 6, a slit fitting means, generally indicated by the reference character 102, serves to open and close a pair of arms 104 and 105 by means of an air cylinder 103, external stoppers 106 preventing arms 104 and 105 from being opened too wide. When the air cylinder 103 is retracted, an internal stopper 107, disposed upon the machine body 3 and a convex piece means 108 disposed upon the rotary body 5 are brought together and abut each other in the clamped state by means of the arms 104 and 105. A proximity switch 109 is also provided.

In operation, the wire delivering unit X clamped at the wire supply station A by means of the clamping means 74, and it is likewise preferable to also lock the planet board 20 upon the support body 57 by suitable means, or alternatively, it may be so arranged that such structure would be clamped along with the planet board 20 by the aforenoted clamping means 74.

Subsequently, the required amount of winding wire 2 is supplied, having been coiled upon the wire drum 22, while a new ring-shaped core wire 1 is disposed within the core wire retaining device 71. The operation of supplying the winding wire 2 into the wire drum 22 can of course, be manually actuated, but it is possible to be mechanized by the use of, for example, a suitable traverse system or the like. Consequently, a predetermined amount of the winding wire 2 may then be drawn out from the wire drum 22 along the wire guide 38 so as to be wound upon a predetermined part of the core wire 1, approximately 1 – 3 coils being formed thereon, whereupon the winding wire end 2' is then bent and slidably hung within the wire end guide groove 72 whereby the wire 2 is clamped upon the core wire 1.

Similarly, at the winding station B, the support body 57 of the wire delivery unit Y is inserted within the aperture 54 such tha each convex projection 59 upon the body 57 is correspondingly engaged within each recess or groove 60 of the flyer 5 and, as best seen within FIGS. 12 and 13, the depending detents 62 are elastically biased, by means of the springs 61 into the recesses or grooves 58, with the result that the support body 57 is locked with respect thereto, although the same has the freedom of loading and unloading. Subsequently, the air cylinder 95 of the clamp release mechanism 93 is then actuated, releasing the clamp claws 84 against the biasing force of tension spring 91 so as to thereby release the projection 63 from its clamped position, whereby the wire delivering unit Y is able to be transferred from the clamping device 74 to the side of the flyer 5 and the rotational motion of the apparatus for the winding operation is then ready to commence.

The handling of the ring-shaped core wire 1 at the stock supplying station was described hereinbefore, and it is noted that the core wire feeding device 12, which had been previously moved aside during rotation of the table 52, is now returned to the predetermined position at which the core wire 1 can be clamp-fed in its peripheral direction whereby the preparation for the winding operation is completed and the winding operation at the winding station may now be accomplished.

The fundamental motions performed during the winding operation are conducted in accordance with the method described heretofore with reference to FIGS. 1–3 wherein the core wire 1 is rotated, while being supported upon the rollers 75 and 76, in the direction of the arrow a, as seen in FIG. 8, by means of the core wire feeding device 12 at the same time that the winding wire end 2' draws out a subsequent supply of winding wire 2 as the latter is also fed in the direction of the arrow a as an integral part of the core wire 1.

Simultaneously, the flyer 5 is also rotated, so as to pass through the through-hole 70 of the turntable 52 in the direction noted by the arrow b, while the wire delivery unit Y is rotated without being interfered with by the turntable 52. Thus, while the bent portion 2' of the winding wire end rotates one revolution integrally with the core wire 1 along the winding wire end guide groove 72, during which time subsequent winding wire 2 is being successively drawn out from the wire drum 22 so as to be spirally wound upon the surface of the core wire 1, the bent portion will pass through the wire winding section, that is, the winding wire transfer section 77 provided within the central aperture 53 of the flyer 5.

Upon conclusion of the first revolution, the winding wire end 2' is transferred, as if jumping over the wire transfer section 77 or a gap from the last end of the guide groove 72 to the first end thereof, and the winding operation then continues to be conducted in the same way at and after the second revolution. Consideration is of course taken into account in such a way that the winding wire end 2', when it traverses or jumps over the wire transfer section 77, does not interfere with the winding wire being wound. It is also to be noted that at the time the above winding operation is being effectuated, the wire drum 22 is braked at all times so that the winding wire 2 is drawn out under tensioned conditions, and from this, it follows that the winding wire 2 is more precisely wound, and also thoroughly adheres to the wire guide 38 so as to be guided thereby.

It is to be further noted that the wire drum 22 revolves in accordance with the revolution of the planet board 20 and therefore rotates in the direction of the restoration of torsion of the winding wire 2 with the auto-rotation of the planet board 20, whereby the torsion generated by the wire guide 38 is automatically compensated for and corrected with the result that the winding wire 2 is always normally spirally wound along the surface of the core wire 1. Such torsion of course depends upon the article size, the screw pitch of the winding wire, the number of windings, and the like, and consequently, if the revolution ratio of the flyer 5 relative to the planet board 20 is properly regulated by means of stepless speed change gear 27 in conjunction with speed control motor 32 corresponding to the noted conditions, torsion will always be able to be precisely corrected.

After an article has been completed at the winding station B, the flyer drive shaft 17 and the core wire feeding device 12 are brought to a stop, and the cut-away slot 50 of the manufacturing machine body 3 is disposed so as to coincide with the cut-away slot 55 of the flyer 5. In such a case, it is convenient to provide an appropriate mechanical or electrical positioning means. In the present example, there is employed a method wherein the number of revolutions of the flyer 5, for announcing the completion of the wire winding operation, is able to be recognized by means of the sensing convex piece means 108 through means of the proximity switch 109, whereby the flyer 5 is controlled without delay and subsequently the air cylinder 103 is activated so as to force arms 104 and 105 to clamp the convex piece 108. By using this method, it is possible to carry out a very precise positioning mode.

As noted heretofore, after the cut-away slot 50 of the manufacturing machine body 3 has been aligned with slot 55 of the flyer 5, the cylinder 95 of the clamp release device 93 is then actuated so as to re-clamp the convex projection 63 of the wire supply unit Y, thereby preparing the unit Y for movement out of the machine and away from machine body 3, the core wire feeding device 12 being similarly moved therewith.

At the article removing station C, an article 1', having been moved from the winding station B upon completion of the winding operation, and having both ends of its winding wire 2 finally connected or secured by any suitable means, comprises a finished product which may be withdrawn to an appointed external position after having been removed from the rollers 75 and 76. In connection with such, the removing operation of the article 1' is effected either manually or by suitable machine mechanisms.

More particularly, at the article removing station C, in addition to the article 1', there has also been carried thereto the wire delivering unit 3, which, as described hereinbefore, is clamped at its convex projection 63 by the clamping means 74, and whose wire drum 22 has already been emptied due to the fact that its winding wire 2 has been consumed during the winding operation at station B. Consequently, the empty wire drum 22 is carried into the stock supplying station A so as to replenish the empty drum 22 with new winding wire 2 for the next winding operation.

It is to be noted that while each operation of the stations A, B, and C has been separately described, the operations at such stations are of course simultaneously conducted in conjunction with each other and in a successive, stage-to-stage order whereby, in such a manner, the appointed product is able to be continuously manufactured without interruption, each of the operations such as for example, the stock supplying, wire winding and article removing operations, being successively performed.

Although the aforenoted description describes one of the exemplary embodiments of the present invention, such is not, however, intended to be a definition of or a limit upon the present invention and further embodiments are possible. For example, with reference to the number of stations, within the previously described embodiment, three stations have been provided, however the expected objects of this invention can be otherwise accomplished. As an illustration of such, it may be envisioned to employ one common station at which both the stock supplying and article removing operations could be performed, or still further, the stock supplying station could be divided into two stations, a core wire supplying station and a winding wire supply station. In addition, the turn-table could be replaced by means of a flat reciprocating plate which would pass through the slit section, and an air cylinder actuating mechanism could be employed for carrying the plate into and out of machinery.

It should be noted further that as the size of the through-holes 70 provided, as bored, within the turn-table 52 are of uniform size and permanent within such structure, whenever the diameter of the core wire 1 varies, it is required to have a corresponding sized turn-table. Nevertheless, if a suitable jig of the required size for rotatably supporting the required sized wire, could be provided upon the table 52, such would be an extremely convenient mechanism whereby the exchange of the turn-table 52 would become unnecessary.

Figure 14:
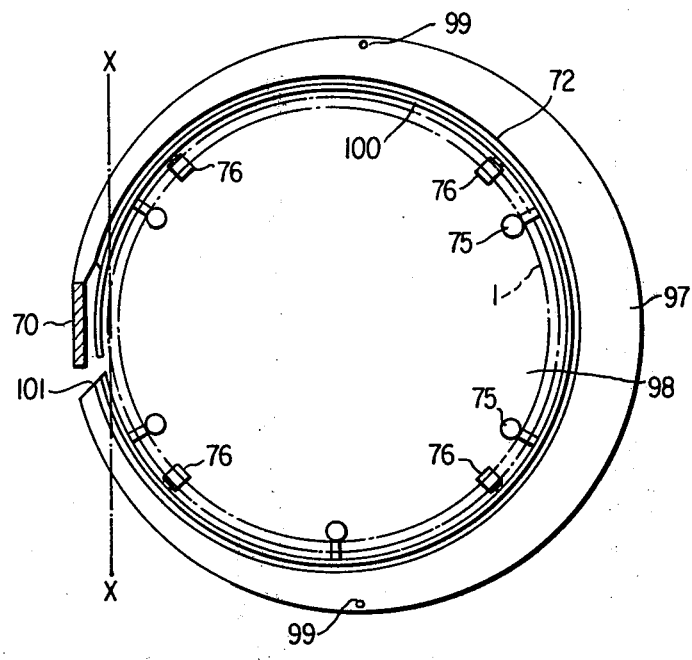
FIG. 14 is a top plan view of a small-diametrcal core wire retaining mechanism.
Figure 15:
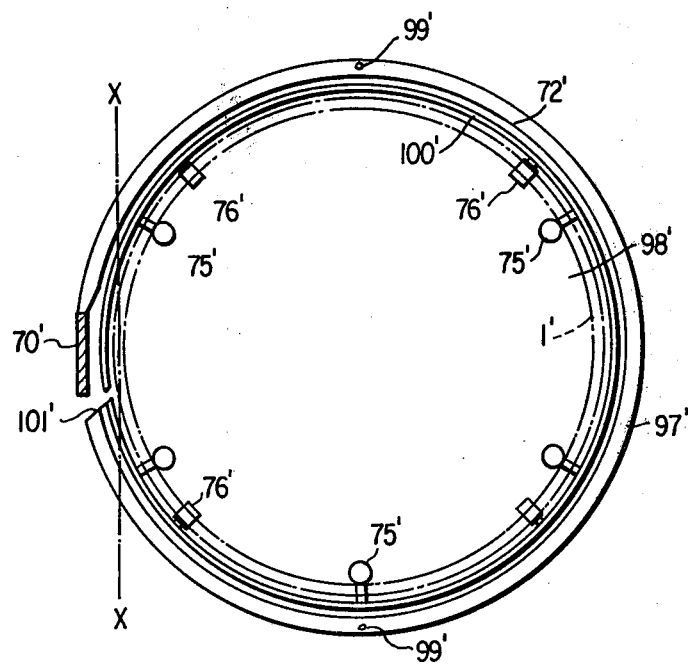
FIG. 15 is a top plan view of a large diametrical core wire retaining mechanism.

Although several different core wire retaining devices may be provided so as to be disposed within each through hole 70 of the turn-table 52 corresponding to the article size, that is, the diameter of the ring-shaped core wire 1' within the exemplary embodiments of the present invention, there is respectively illustrated, only a device for retaining a small sized core wire 1 and one for retaining a large sized core wire 1', as seen in FIGS. 14 and 15, respectively. All these devices basically comprise circular through holes 98 and 98' provided within predetermined portions of the circular beds 97 and 97' and a plurality of interior rollers 75 and 75' as well as lower guide rollers 76 and 76' supported beneath the wire core, are disposed upon the internal periphery of the through holes 98 and 98', respectively.

In this case, the external form of both beds 97 and 97' is of the same size and contour with respect to each other, and they are so constructed as to be able to be releasably set within each through hole of the turn-table 52, however, it is also noted that the centers of the circular through holes 98 and 98' and the setting position of each guide roller are not always coincident with the centers of the beds 97 and 97' due to the fact that they are so disposed that a part of the core wires 1 and 1' retained by them is always able to pass through the central axis X—X of rotation of the flyer 5. The setting holes for the turn-table 52 are shown at 99 and 99'.

The winding wire end grooves 72 and 72' for clamping the winding wire end portions to the ring-shaped core wire, have, at required positions thereof, winding wire transfer sections 77 and 77', formed therein. It is also taken into consideration that the winding wire delivery operation may be smoothly conducted between the first and last guide ends of the interior walls 100 and 100' of the guide grooves 72 and 72' at both the front and rear sides of the winding wire transfer sections 77 and 77', and subsidiary walls particular and 101' are also provided for preventing the winding wire from undergoing or exhibiting any extraordinary radially outward projection upon being delivered.

The clamping means 74 are shown as being of the self-locking type and being biased by means of a tension spring 91, however the same may alternatively be equipped with an air cylinder or the like secured upon the table 52, and any other optional mechanism, other than of the leverform type as shown in the illustrated structure, may be utilized. As to the swivel actuator device 64 for operating the turn-table 52, various other devices of every sort and kind may be of course be employed, the particular disclosed device being illustrated without any paticular definition or limitation.

As to the method or means for clamping the winding wire end 2' upon the core wire 1 which has been adopted within the aforenoted example, the winding wire end guide groove 72 disposed along the rotational locus of the core wire 1 and the transfer section 77 have been provided merely as a prewinding expedient. It does not in fact matter whatever such particular means might be, as long as the winding wire end guide provided along the rotational locus of the core wire is such as to prevent the winding wire end from spinning around the core wire while the latter is rotating along its circumference, and to move in accordance with the rotation of the core wire along its circumference, the groove being provided upon a part thereof with the transfer section in order to insure that the winding wire will pass therethrough without a need for relinquishing the end part of the winding wire. Aside from such, some other conventional movable fixture means, may of course be suitable and utilized.

As regards the retaining devices 71 for the core wire 1, various other guide rollers can of course be utilized in lieu of the rollers 75 and 76 shown within the figures, the only condition being the fact that they be capable of rotatably retaining the core wire 1 at the predetermined position of the turn-table 52.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An apparatus for the continuous manufacture of annular helix beads including a winding wire wound around a core wire, comprising:

a core wire drive mechanism for rotating said core wire in its peripheral direction;

a rotary body rotating, while passing through the ring of said core wire, about a central part thereof;

a rotary body drive mechanism for rotating said rotary body;

a drum support mechanism rotatably disposed within said rotary body and being capable of passing through said rotary body for performance of loading and unloading operations;

a wire drum, for storing said winding wire, rotatably disposed within said drum support mechanism;

a carrying table for shifting said core wire between different operative stations, and for retaining said core wire while rotating said core wire in its peripheral direction, said table passing through a slit section of radial length provided within said rotary body; and a loading-unloading mechanism for said drum support mechanism.

2. An apparatus as defined in claim 1, wherein said apparatus further comprises:

a position setting mechanism for accurately terminating the rotation of said rotary body so as to align the position of said slit section of said rotary body within the same plane as said carrying table at the conclusion of said rotation of said rotary body.

3. An apparatus as defined in claim 2, wherein said position setting mechanism comprises:

a sensing mechansim for determining the number of rotations of said rotary body; and a positioning mechanism actuated in response to a signal from said sensing mechanism.

4. An apparatus as defined in claim 2, wherein:

said positioning mechanism is a holding apparatus to secure a convex piece means provided upon said rotary body.

5. An apparatus as defined in claim 1, wherein:

said drum support mechanism is disposed within a setting aperture provided within said rotary body; and the central portion of said setting aperture for said drum support mechanism is established closer to a slit opening section than a center line orthogonal to a cutting line within said slit section.

6. An apparatus as defined in claim 1, wherein:

said drum support mechanism is disposed within a setting aperture provided within said rotary body; and said aperture communicates with said slit section.

7. An apparatus as defined in claim 6, wherein the central-portion of said setting aperture for said drum support mechanism is disposed at the central point of the cutting line within said slit section.

8. An apparatus as defined in claim 7, wherein:

said carrying table together with said drum support mechanism is able to shift while passing through said slit section.

9. An apparatus as defined in claim 8, wherein:

said loading-unloading mechanism for said drum support mechanism is provided upon said carrying table.

10. An apparatus as defined in claim 1, wherein: said carrying tablet is attachably provided with a core wire retaining device for rotatably supporting said core wire.

11. An apparatus as defined in claim 10, wherein: said core wire retaining device includes a winding wire guide furnished upon said carrying table and disposed along the rotational locus of said core wire; and said guide includes means for preventing the end of said winding wire from spinning around said core wire as the latter rotates in the peripheral direction, yet permitting said winding wire to more in accordance with the rotation of said core wire along its circumference, said guide having upon a part thereof a passage section for permitting said winding wire to pass therethrough.

12. An apparatus as defined in claim 1, wherein: said carrying table shifts within a plane orthogonal to the surface of said rotary body.

13. An apparatus as defined in claim 12, wherein: said carrying table is a turntable having a plane orthogonal to the surface of said rotary body.

14. An apparatus as defined in claim 12, wherein: insertion and withdrawal means for said core wires are mounted upon said carrying table.

15. An apparatus as defined in claim 13, wherein; a core wire and winding wire supply station, a wire winding station, and an article removing station are provided on said carrying table.

16. An apparatus as defined in claim 1, wherein: a brake mechanism, actuated only when said winding wire is drawn out from said drum is disposed upon said drum support mechanism.

17. An apparatus as defined in claim 1, wherein said apparatus further comprises:

a differential gear mechanism for changing the speed ratio of the rotational speed of said core wire to the wire winding speed upon said core wire is provided; and a clutch mechanism for timely manipulating said differential mechanism.

18. An apparatus as defined in claim 17, wherein said apparatus further comprises:

a motion period control mechanism for operating said clutch mechanism at a predetermined time with respect to a predetermined period of operation of said apparatus.

* * * * *